United States Patent [19]
Bognar

[11] 3,775,085
[45] Nov. 27, 1973

[54] FORMING VESSELS FROM GREEN GLASS-CERAMIC SHEETS

[75] Inventor: Lewis L. Bognar, Painted Post, N.Y.

[73] Assignee: Corning Glass Works, Corning, N.Y.

[22] Filed: July 25, 1972

[21] Appl. No.: 274,927

Related U.S. Application Data
[62] Division of Ser. No. 26,492, April 8, 1970, Pat. No. 3,681,043.

[52] U.S. Cl........................ 65/289, 65/106, 65/291
[51] Int. Cl............................................ C03b 23/02
[58] Field of Search..................... 65/106, 288, 289, 65/33, 287, 290

[56] References Cited
UNITED STATES PATENTS

| | | | |
|---|---|---|---|
| 787,438 | 4/1905 | Cutler | 65/287 |
| 1,236,937 | 8/1917 | Hough, Jr. | 65/106 |
| 3,177,060 | 4/1965 | Pedersen | 65/289 X |
| 2,182,448 | 12/1939 | Paddock | 65/287 |
| 3,009,201 | 11/1961 | Hansen | 65/287 X |

Primary Examiner—Frank W. Miga
Attorney—Clarence R. Patty, Jr. et al.

[57] ABSTRACT

Green glass sheets which are crystallizable into a glass-ceramic upon the application of heat, are heat-softened and vacuum-formed into vessel shaped articles, through a controlled application of radiant heat which is applied at such a rate so as to heat soften and form the green glass sheet before the sheet has an opportunity to nucleate and crystallize into a rigid glass-ceramic material.

3 Claims, 4 Drawing Figures

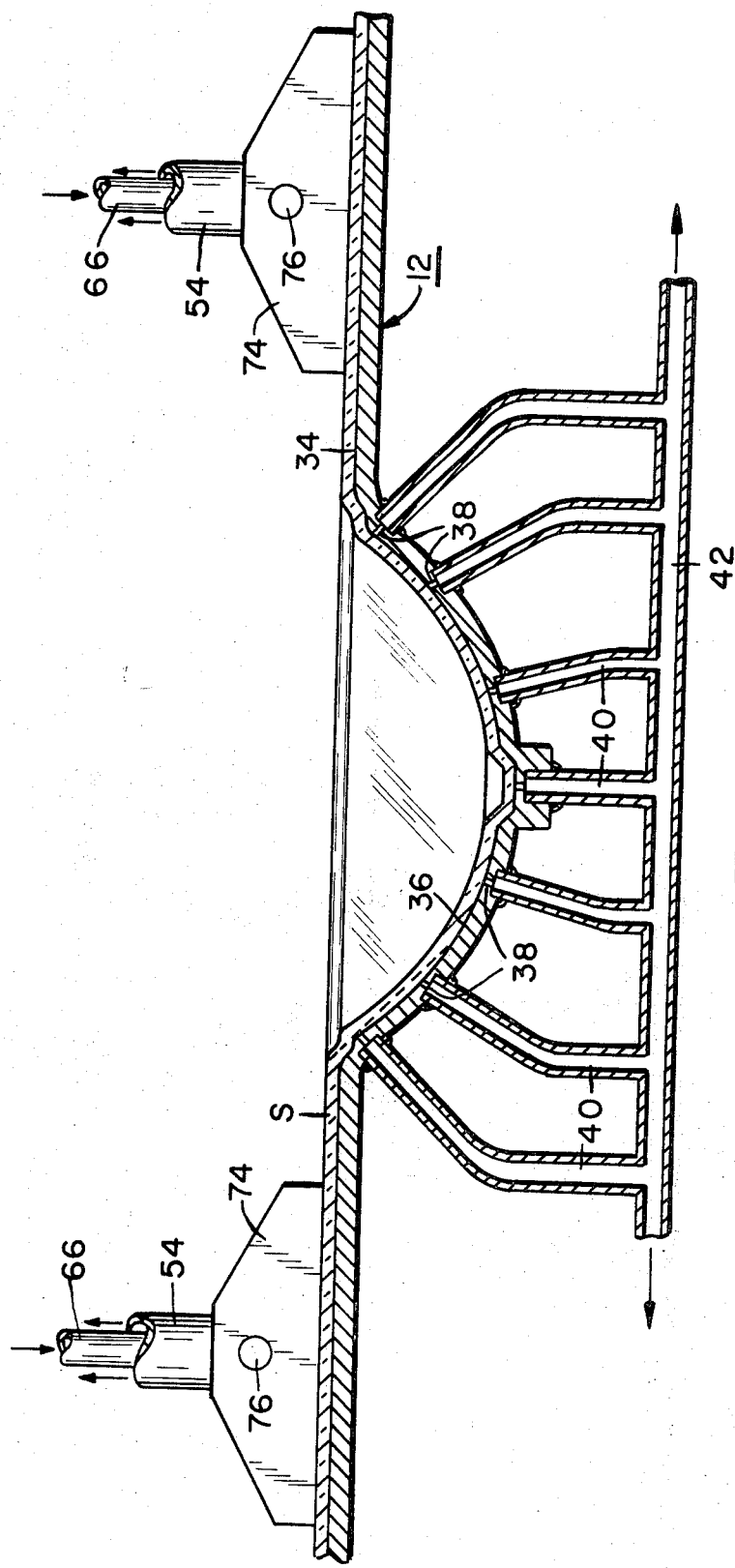

FORMING VESSELS FROM GREEN GLASS-CERAMIC SHEETS

This is a division of application Ser. No. 26,492, filed Apr. 8, 1970 now U.S. Pat. No. 3,681,043.

BACKGROUND OF THE INVENTION

The present invention pertains generally to the art of re-shaping thermoplastic materials through the application of heat and vacuum, and more particularly to the problems encountered in that segment of the art wherein reforming has not heretofore been possible due to the crystallization and associated increase in viscosity of the material during heating and prior to the completion of a desired forming operation.

It is well known in the art to vacuum form thermoplastic materials, such as standard glass compositions, into vessel-like shaped articles through the application of heat. However, as will be readily understood by those skilled in the art, the prior art processes for vacuum forming sheet glass, in no way contemplate or are applicable to the specific problems encountered in reforming sheets of crystallizable composition, even though the prior art references appear to have some similarities.

In reforming glass sheets into vessel shaped articles, it has been customary to place a sheet of glass over a mold and then elevate both the mold and glass to a temperature level wherein the viscosity of the glass is lowered sufficiently to facilitate the forming thereof through the application of a vacuum. However, this prior art method of forming glass sheets is completely unsatisfactory to form items from a crystallizable glass-ceramic material. That is, when a sheet of green glass which is crystallizable into a glass-ceramic is elevated in temperature, nucleation and the formation of a crystalline phase begins to develop which causes the viscosity of the material to rise, thus reducing the extent to which the glass could normally be formed. Although it would be possible to elevate the temperature of the glass near its remelting point in order to lower the viscosity for forming, such a process destroys the desirable properties of the green glass and results in excessive grain growth, rough surface features, increased internal stresses, and lower strength. Further, when applying sufficient heat to resoften crystallized glass-ceramic material, the surface usually reverts back to a low viscosity glassy phase before the body portion is so converted, thus causing the iten to adhere to the mold and destroy the surface finish of the glass as well as the mold.

The present invention overcomes the problems heretofore encountered in attempting to form green glass-ceramic sheet with the known methods, by heating the green glass-ceramic sheet in such a matter that the softening of the material and the completion of the forming operation take place prior to excessive nucleation and formation of ceramic crystals in the glass.

The problem encountered in reforming a sheet of green glass-ceramic material into shaped articles can best be illustrated by examining the phenomena which transpires as a sheet of such material is raised in temperature. As the temperature of the glass is raised upwardly through the annealing point and toward the softening point of the glass, it passes through a transformation range wherein nucleation begins. As the temperature is increased, the viscosity of the green glass-ceramic initially begins to decrease, and accordingly the rate of nucleation increases as well as the formation of crystals on the nuclei. Since the viscosity of the green glass-ceramic is instantaneous with time at temperature, and since nucleation and crystallization require both time and temperature to be accomplished, the viscosity of the green glass-ceramic sheet at its softening point will be dependent upon the time interval required for the glass to reach such temperature. That is, if a customary glass heat-up cycle is utilized, sufficient nucleation and crystallization will occur prior to reaching the softening point such that the grain growth will increase viscosity to form a substantially rigid and non-formable sheet. If, on the other hand, a high rate of heat is applied to the green glass-ceramic sheet, it will reach its softening point temperature before any detrimental nucleation or crystallization can occur, and accordingly the viscosity will be decreased at such temperature so that the sheet may be reformed into articles of desired shape.

SUMMARY OF THE INVENTION

According to the present invention a sheet of green glass-ceramic material is vacuum formed into a vessel-shaped article prior to the time that the sheet becomes rigid through nucleation and crystallization. A suitable mold is preheated within a kiln or furnace by high radiant energy output burners to a temperature corresponding to about the softening point temperature of the glassy phase of the glass-ceramic material to be formed. A sheet of green glass at room temperature is then positioned within the furnace and initially receives heat on its bottom surface by both conduction and radiation from the preheated mold, and on its upper surface both from the furnace atmosphere and the overhead radiant heaters. Since the heat input to the sheet is at a uniform rate along the sheet and through both of its major surfaces, thermal stresses do not develop which might otherwise result in thermal shock. Immediately after the sheet is positioned within the furnace, a high rate of heat is supplied by a plurality of gas-air burners to maintain the ambient temperature within the furnace at about the softening point temperature of the green glass-ceramic material. Since the high input rate of radiant heat penetrates the surfaces of the glass, the glass temperature is raised rapidly to about its softening point in a short period of time. As a result, the viscosity of the glass is reduced at a faster rate than the rate at which sufficient nucleation and crystallization could occur which would retard the process of heat softening.

Vacuum is applied within the mold cavity at approximately the time when the temperature of the glass passes the annealing point, after a plurality of hold-down shoes are lowered into engagement with upper surface portions of the sheet. The shoes, which engage peripheral portions of the sheet, function to maintain the sheet in contact with the mold and prevent buckling and a loss of vacuum as it is drawn into the mold. As the glass reaches its softening point temperature, it is rapidly formed into the configuration of the mold cavity through the action of the negative pressure exerted by the vacuum. By the time that the forming is complete, nucleation and grain growth have had sufficient time to rise in rate so as to prevent any further forming or deformation of the vacuum-formed article. As a result, the newly formed article may be immediately removed from the mold for annealing or further heat treatment, thereby making the hot mold equipment immediately available to repeat the process cycle.

An object of the present invention has been to provide novel method and apparatus for forming vessel-shaped articles from green glass-ceramic sheets, through the application of heat and vacuum, but prior to such time as nucleation and crystallization increase the viscosity and rigidify the sheet preventing further forming and deformation.

BRIEF DESCRIPTION OF THE DRAWINGS

FIG. 4 is an enlarged sectional view of a vacuum system connected with the mold cavity shown in FIG. 1.

DESCRIPTION OF THE PREFERRED EMBODIMENTS

Figure 1:
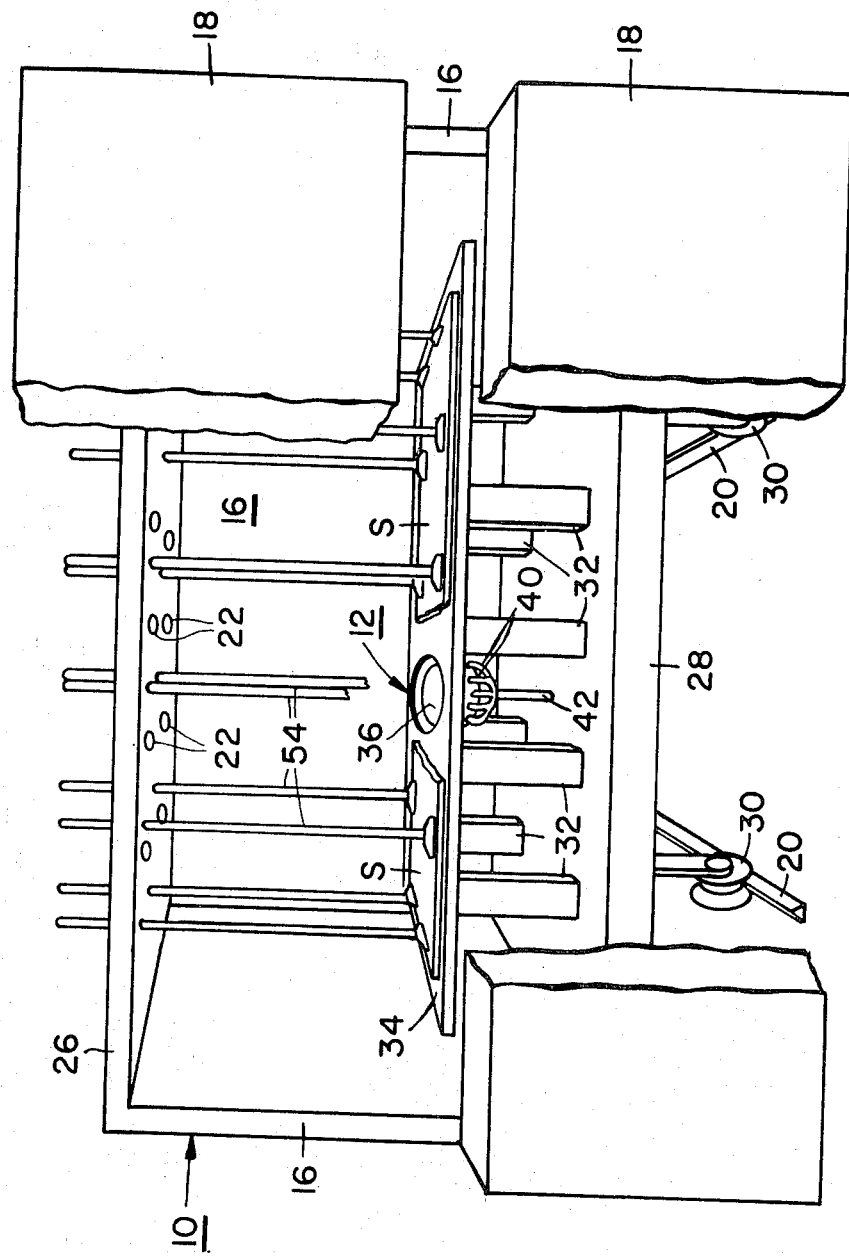
FIG. 1 is a somewhat schematic perspective view of apparatus for performing the novel method of the present invention.
Figure 2:
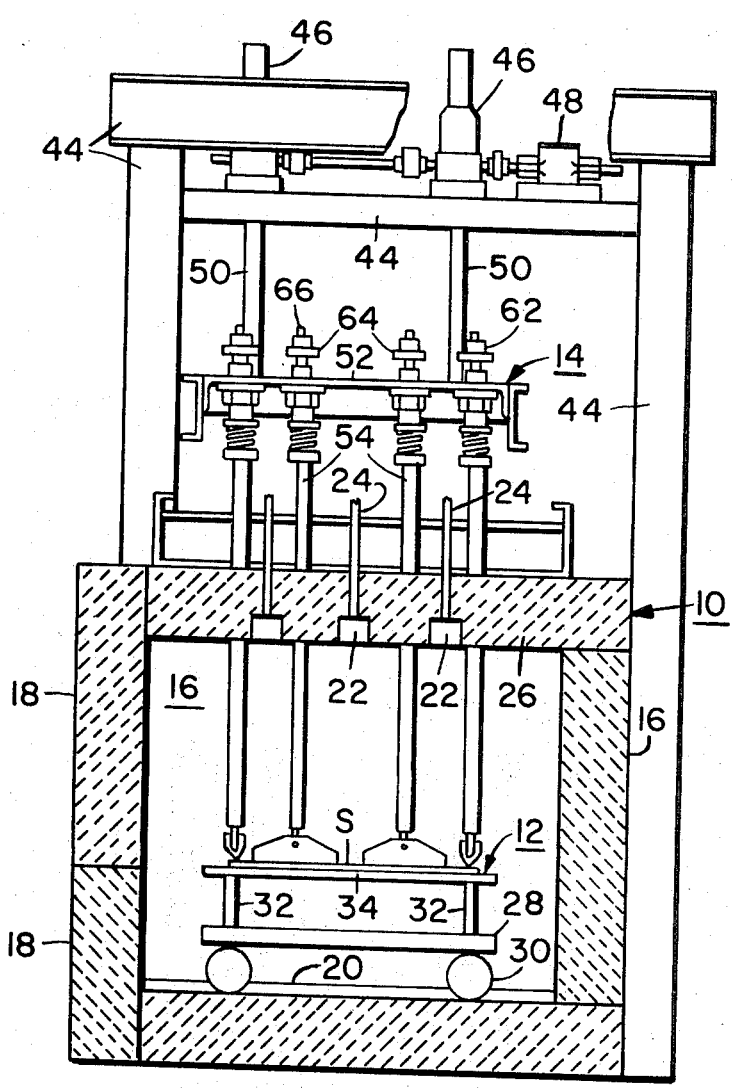
FIG. 2 is an end elevational view in section of apparatus shown in FIG. 1, but omitting details as to the mold structure while illustrating the details as to the overhead operating mechanism.

Referring now to the drawings, and particularly FIGS. 1 and 2, apparatus for forming green glass-ceramic sheets according to this invention is shown comprising a kiln or furnace 10 having a movable mold assembly 12 and a hold-down assembly 14. The kiln or furnace 10 has a plurality of refractory walls 16 and suitable refractory door members 18 which are movable for opening and closing the kiln. Upon opening both upper and lower refractory door members 18, mold assembly 12 is movable into and out of the kiln 10 along tracks 20, whereas it is possible to position a green glass-ceramic sheet S upon the mold assembly within the kiln merely by opening the upper refractory door member 18. A plurality of gas-air fired high energy radiant output burners 22, connected to a suitable source of fuel through inlet lines 24, are positioned within the roof 26 of the kiln 10.

The movable mold assembly 12 is shown comprising a carriage bed 28 movable along tracks 20 by means of wheels 30. A plurality of support columns 32 support a substantially planar mold surface 34 having a mold cavity 36 of desired contour formed therein. As shown particularly in FIG. 4, the mold cavity 36 is provided with a plurality of vacuum ports 38 connected by means of conduits 40 to a central header 42 which is connected to a suitable source of vacuum. Although the cavity may be shaped in virtually any desired configuration, cavity 36 as shown in the form of a sink-type vessel such as a domestic lavatory.

Figure 3:
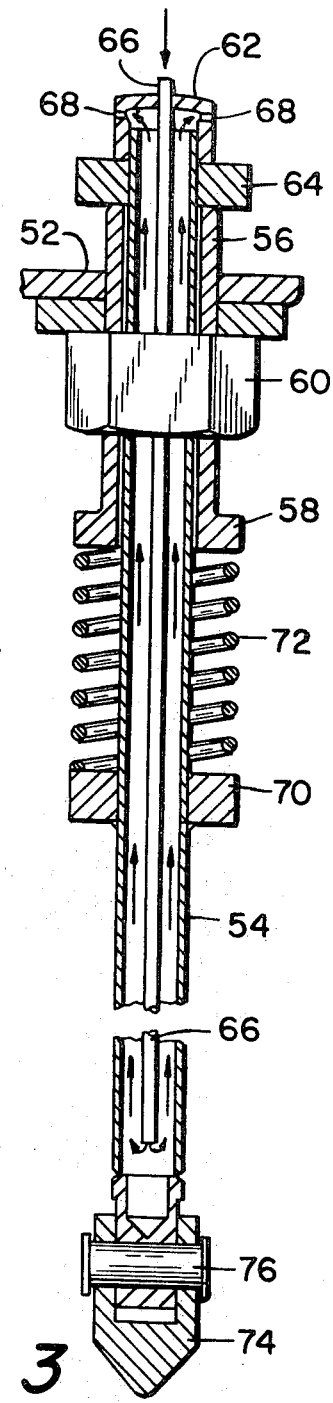
FIG. 3 is an enlarged elevational view in section of the details of a hold-down device shown in FIG. 2.

The hold-down assembly 14 as shown particularly in FIGS. 2 and 3, includes a supporting frame structure 44, ball screw jacks 46, and suitable driving means 48 for the ball screw jacks, such as an electric motor or power take-off. Rods 50, having lead screw end portions associated with screw jacks 46, move upwardly and downwardly in unison in response to the driving means imparted to the screw jacks. A support platform 52 is securely connected to the lower ends of rods 50 and accordingly is suspended for upward and downward movement in response to movement imparted by screw jacks 46.

A plurality of hold-down arms 54 are resiliently connected to the support platform 52 by means of a plurality of sleeve members 56. Each sleeve 56, having a lower flanged portion 58, projects through an opening in platform 52 and is secured thereto by means of bolt 60 and a stop collar 64. Hold-down legs 54 are preferably hollow in order to facilitate cooling, and accordingly the upper end portion of each leg is provided with a closing cap 62. Stop collar 64, which normally abuts the upper end of sleeve 56, is also attached to an upper portion of each leg 54. A cooling inlet tube 66 projects through a central opening in cap 62 and extends to a lower portion of hold-down leg 54, and a plurality of outlet openings 68 are provided to exhaust the cooling fluid from the interior of the legs 54.

A retaining collar 70 is secured to a mid-portion of each hold-down leg 54, and a spring member 72 surrounds the leg portion 54 to exert an outward pressure between flange 58 and retaining collar 70, so that stop collar 64 is normally in engagement with the upper end of sleeve 56. It thus can be seen, that each leg member 54 is slidably retained within a sleeve member 56, and is normally resiliently urged outwardly by means of a force exerted by spring member 72 against retaining collar 70. The lower end of each leg 54 has a foot member 74 pivotally secured thereto by means of retaining pivot pin 76. The lower end of each foot member 74 may be tapered or rounded as shown.

In operation, upper and lower refractory door members 18 are opened to permit the movable mold assembly 12 to be rolled along tracks 20 into position within kiln 10. The mold 34 may be made of any suitable material such as stainless steel or low expansion ceramic such as petalite. The gas-air radiant energy burners 22 are then activated to raise the ambient temperature of the furnace as well as the mold temperature to a level corresponding to about the softening point temperature of the green glass-ceramic sheet to be formed. After reaching such temperature, upper door member 18 is opened and a sheet of green glass material at room temperature is positioned upon mold surface 34 within the furnace 10. A high rate of heat input is then applied by radiant burners 22 to maintain the ambient temperature within the furnace at about the desired softening point temperature. Initially, the green glass-sheet receives heat up through its bottom surface by both conduction and radiation from the preheated mold while simultaneously receiving heat upon its upper surface by the radiant heaters. Since the heat input to the sheet is at a uniform rate through both of its major surfaces, no undesirable thermal stresses are developed which might cause breakage due to thermal shock.

As the temperature of the glass is raised upwardly through its annealing point, it passes through its transformation range wherein nucleation begins to occur. Although the glass cannot yet elongate at this temperature, the vacuum is applied to cavity 36 by means of ports 38, conduits 40 and header 42. In addition, driving means 48 is activated to lower support platform 52 through screw jacks 46 and rods 50. As a result, hold-down legs 54 are lowered so that foot portions 74 engage peripheral portions of the sheet S to hold it in a planar position on the mold surface 34. After foot members 74 engage the upper surface of sheet 34, support platform 52 is moved downwardly a short distance in order to provide a predetermined resilient compressive force through spring members 72 to the sheet, and in order to compensate for any unevenness in its surface. In addition, the fact that the foot members are pivotally connected to legs 54, functions to evenly distribute the compressive force to the sheet, and thereby prevent buckling of the sheet as the glass is formed in the mold.

The green glass-ceramic quickly reaches its softening point and is immediately formed into the contour of the mold cavity through the application of the vacuum. However, by this time the rate of nucleation and crystallization at the softening temperature is sufficient to increase grain growth to such an extent so as to stop further forming or deformation of the glass. Accordingly, the hold-down assembly 14 is retracted by means of screw jacks 46 so as to remove the foot members 74 from the newly formed sheet, vacuum is interrupted and the doors 18 are opened so that the mold assembly 12 may be moved outwardly along tracks 20. The newly formed rigidified sheet is then removed from the mold surface for further heat treatment and annealing as desired, and a new sheet of green glass-ceramic material is positioned on the heated mold surface 34 and the mold assembly 12 is indexed back into the furnace 10 so that the cycle may be repeated.

It will be understood that the invention is applicable to any green glass sheet composition which is crystallizable upon the application of heat to form a glass-ceramic, such as disclosed in U.S. Pat. No. 2,920,971. Since it will be readily understood by those skilled in the art that the various parameters of the operation will vary with the particular composition, thickness, and softening point of the green glass-ceramic sheet utilized, the following specific example is by no means limiting in nature. A petalite mold was preheated to a temperature of about 950°C. A 0.200 inch thick sheet of Corning code 0335 glass-ceramic material, of about 30 inch × 30 inch, while at room temperature was placed in the kiln on the preheated mold. High energy radiant heat was applied to the sheet by overhead gas-air fired burners and the glass was brought to a temperature above its annealing point, i.e. about 750°C–800°C in about three minutes. At this time a vacuum of about 25 inches of mercury was applied to the mold cavity and the hold-down assembly moved into engagement with peripheral portions of the sheet. In about 4 ½ minutes total time, the sheet reached its softening temperature of about 950°C, and the forming was completed to the contour of the mold cavity. Although not necessary, the sheet was retained at this temperature in the mold for an additional one-half minute in order to bring about complete nucleation and partial ceraming of the item, where upon the formed sheet was then removed from the mold after a total time of five minutes.

The hold-down legs and foot members are formed of any suitable material which is compatible with the high temperature generated in the kiln, such as stainless steel. During the forming operation, air is supplied to the interior of the hold-down legs 54 in order to provide cooling and prevent warpage. Although the cooling air is shown as being supplied centrally to and being exhausted exteriorly from the tubular hold-down legs 54, more uniform cooling may be provided by reversing the flow from that shown. In addition, mold surface 34 may be provided with a plurality of vacuum ports so as to hold exterior portions of the sheet S in a planar position during the forming operation.

Although I have disclosed the now preferred embodiments of my invention, it will be apparent to those skilled in the art that various changes and modifications may be made thereto without departing from the spirit and scope thereof as defined in the appended claims.

I claim:

1. Apparatus for forming articles from sheets of green glass-ceramic material which crystallize upon the application of heat to form a glass-ceramic comprising, a refractory kiln, a movable mold assembly removably positionable within said kiln, said mold assembly having an upper mold surface for receiving a sheet of green glass-ceramic to be formed, a hold-down assembly within said kiln and above said upper mold surface for maintaining portions of said sheet in planar contact with said mold surface; said hold-down assembly including a plurality of spaced-apart hold-down legs positioned above said mold surface about the periphery thereof, means for raising and lowering said plurality of legs in unison, foot means on the lower end of each of said hold-down legs for independently engaging an upper surface portion of said sheet in spaced-apart relation with respect to an adjacent foot means, and means on each said hold-down leg for resiliently applying a desired compressive force to said sheet through said foot means independently of the force exerted by adjacent foot means as said legs are lowered in unison so that said foot means move into engagement with said sheet.

2. Apparatus as defined in claim 1 wherein said foot member is pivotally connected to the lower end of each of said hold-down legs.

3. Apparatus as defined in claim 1 wherein each of said hold-down legs is of a hollow tubular construction, a closure end cap is positioned over the upper end of each said leg, and inlet and outlet means are formed in said cap for circulating cooling fluid through the interior of each said leg.

* * * * *